US008594056B2

(12) United States Patent
Rick et al.

(10) Patent No.: US 8,594,056 B2
(45) Date of Patent: Nov. 26, 2013

(54) METHOD AND APPARATUS FOR DYNAMIC AND DUAL ANTENNA BLUETOOTH (BT)/WLAN COEXISTENCE

(75) Inventors: Roland R. Rick, San Diego, CA (US); Michael Kohlmann, San Diego, CA (US); Mark Vernon Lane, San Diego, CA (US); Joel Benjamin Linsky, San Diego, CA (US); Vincent Knowles Jones, San Diego, CA (US); Alireza Raissinia, San Diego, CA (US); Gopal Chillariga, San Diego, CA (US); Eric Y. Tsou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 319 days.

(21) Appl. No.: 12/815,342

(22) Filed: Jun. 14, 2010

(65) Prior Publication Data

US 2010/0316027 A1 Dec. 16, 2010

Related U.S. Application Data

(60) Provisional application No. 61/187,573, filed on Jun. 16, 2009.

(51) Int. Cl.
H04J 3/00 (2006.01)

(52) U.S. Cl.
USPC .......... 370/336; 455/41.2; 455/422.1

(58) Field of Classification Search
None
See application file for complete search history.

(56) References Cited

U.S. PATENT DOCUMENTS

| 5,486,210 | A | 1/1996 | Kerr et al. |
|---|---|---|---|
| 7,035,314 | B1 | 4/2006 | Linsky |
| 7,317,900 | B1 | 1/2008 | Linde et al. |
| 7,433,970 | B1 | 10/2008 | Euler et al. |
| 7,440,728 | B2 | 10/2008 | Abhishek et al. |
| 7,685,325 | B2 | 3/2010 | Batchelor et al. |
| 7,786,755 | B2 | 8/2010 | Yao et al. |
| 7,809,012 | B2 | 10/2010 | Ruuska et al. |
| 7,903,642 | B2 | 3/2011 | Voutilainen et al. |
| 7,990,992 | B2 | 8/2011 | Muukki et al. |
| 8,095,176 | B2 | 1/2012 | Sudak |

(Continued)

FOREIGN PATENT DOCUMENTS

| DE | 19602535 C1 | 9/1996 |
|---|---|---|
| EP | 1220460 A2 | 7/2002 |

(Continued)

OTHER PUBLICATIONS

Baghel, et al., "Coexistence Possibilities of LTE with ISM Technologies and GNSS," IEEE, 2011 International Conference on Communications, Jan. 28-30, 2011. p. 1-5.

(Continued)

Primary Examiner — Jianye Wu
(74) Attorney, Agent, or Firm — Stanton Braden

(57) ABSTRACT

An apparatus and method are disclosed for effectively and efficiently arbitrating concurrent usage between WLAN and Bluetooth access technologies for co-located wireless devices. A state level arbiter determines state and relevant parameters of a WLAN module and of a Bluetooth module of a wireless transceiver unit. The state level arbiter uses the state and relevant parameters to determine which access technology (WLAN or Bluetooth) or combination of the access technologies (WLAN or Bluetooth) will provide the best concurrent performance for wireless transmissions at a given time for specific Bluetooth states and WLAN states.

49 Claims, 8 Drawing Sheets

(56) References Cited

U.S. PATENT DOCUMENTS

| | | |
|---|---|---|
| 2002/0167963 A1 | 11/2002 | Joa-Ng |
| 2003/0135675 A1 | 7/2003 | Pontius et al. |
| 2004/0028003 A1 | 2/2004 | Diener et al. |
| 2004/0052272 A1 | 3/2004 | Frank |
| 2004/0259589 A1 | 12/2004 | Bahl et al. |
| 2005/0047038 A1 | 3/2005 | Nakajima et al. |
| 2005/0289092 A1 | 12/2005 | Sumner et al. |
| 2006/0025181 A1* | 2/2006 | Kalofonos et al. ............ 455/574 |
| 2006/0089119 A1* | 4/2006 | Lipasti et al. ................. 455/410 |
| 2006/0166628 A1 | 7/2006 | Anttila |
| 2006/0292986 A1 | 12/2006 | Bitran et al. |
| 2007/0105548 A1* | 5/2007 | Mohan et al. .............. 455/426.1 |
| 2007/0135162 A1 | 6/2007 | Banerjea et al. |
| 2007/0165754 A1 | 7/2007 | Kiukkonen et al. |
| 2007/0206631 A1 | 9/2007 | Parts et al. |
| 2007/0232349 A1 | 10/2007 | Jones et al. |
| 2007/0248114 A1 | 10/2007 | Jia et al. |
| 2007/0255850 A1 | 11/2007 | Gould et al. |
| 2007/0281617 A1 | 12/2007 | Meylan et al. |
| 2008/0045152 A1 | 2/2008 | Boes |
| 2008/0130580 A1 | 6/2008 | Chaponniere et al. |
| 2008/0161041 A1 | 7/2008 | Pernu |
| 2008/0192806 A1 | 8/2008 | Wyper et al. |
| 2008/0227456 A1 | 9/2008 | Huang et al. |
| 2008/0254745 A1* | 10/2008 | Zhang et al. ................. 455/41.2 |
| 2008/0279137 A1 | 11/2008 | Pernu et al. |
| 2008/0279155 A1 | 11/2008 | Pratt, Jr. et al. |
| 2008/0287158 A1 | 11/2008 | Rayzman et al. |
| 2009/0033550 A1 | 2/2009 | Wolf |
| 2009/0040937 A1 | 2/2009 | Xhafa et al. |
| 2009/0061781 A1 | 3/2009 | Zhang |
| 2009/0116437 A1 | 5/2009 | Alexandre et al. |
| 2009/0116573 A1 | 5/2009 | Gaal et al. |
| 2009/0137206 A1* | 5/2009 | Sherman et al. ............. 455/41.2 |
| 2009/0180451 A1 | 7/2009 | Alpert et al. |
| 2009/0196210 A1* | 8/2009 | Desai ........................... 370/311 |
| 2009/0252053 A1 | 10/2009 | Leith et al. |
| 2009/0252128 A1 | 10/2009 | Yang et al. |
| 2009/0257380 A1 | 10/2009 | Meier |
| 2009/0262785 A1 | 10/2009 | Wilhelmsson |
| 2009/0310501 A1 | 12/2009 | Catovic et al. |
| 2010/0085951 A1 | 4/2010 | Pernu et al. |
| 2010/0130129 A1* | 5/2010 | Chang et al. ................. 455/41.2 |
| 2010/0137025 A1 | 6/2010 | Tal et al. |
| 2010/0141399 A1 | 6/2010 | Swope |
| 2010/0142500 A1 | 6/2010 | Sudak |
| 2010/0153760 A1 | 6/2010 | Gupta et al. |
| 2010/0158037 A1 | 6/2010 | Heinke et al. |
| 2010/0197235 A1 | 8/2010 | Wilhelmsson |
| 2010/0203832 A1 | 8/2010 | Russell et al. |
| 2010/0273426 A1 | 10/2010 | Walley et al. |
| 2010/0304685 A1 | 12/2010 | Wietfeldt et al. |
| 2010/0304770 A1 | 12/2010 | Wietfeldt et al. |
| 2010/0311455 A1 | 12/2010 | Armstrong et al. |
| 2010/0322287 A1 | 12/2010 | Truong et al. |
| 2010/0329161 A1 | 12/2010 | Ylanen et al. |
| 2010/0329162 A1 | 12/2010 | Kadous et al. |
| 2010/0330977 A1 | 12/2010 | Kadous et al. |
| 2010/0331029 A1 | 12/2010 | Linsky et al. |
| 2011/0007680 A1 | 1/2011 | Kadous et al. |
| 2011/0007688 A1 | 1/2011 | Veeravalli et al. |
| 2011/0009136 A1 | 1/2011 | Mantravadi et al. |
| 2011/0026432 A1 | 2/2011 | Gruber et al. |
| 2011/0026458 A1 | 2/2011 | Gruber et al. |
| 2011/0105027 A1 | 5/2011 | Linsky |
| 2011/0116490 A1 | 5/2011 | Wilhelmsson et al. |
| 2011/0199989 A1 | 8/2011 | Wietfeldt et al. |
| 2011/0249603 A1 | 10/2011 | Rick et al. |
| 2012/0034870 A9 | 2/2012 | Desai et al. |
| 2012/0129457 A1 | 5/2012 | Linsky |
| 2012/0213303 A1 | 8/2012 | Kadous et al. |
| 2012/0230303 A1 | 9/2012 | Guo et al. |

FOREIGN PATENT DOCUMENTS

| | | |
|---|---|---|
| EP | 1489788 A2 | 12/2004 |
| EP | 1551080 A1 | 7/2005 |
| EP | 1589781 | 10/2005 |
| EP | 1659814 A1 | 5/2006 |
| EP | 1681772 A1 | 7/2006 |
| EP | 1705936 | 9/2006 |
| EP | 1729464 A1 | 12/2006 |
| EP | 1959619 | 8/2008 |
| EP | 2068452 | 6/2009 |
| GB | 2412817 A | 10/2005 |
| WO | WO9422239 | 9/1994 |
| WO | WO0230133 A2 | 4/2002 |
| WO | WO03105418 | 12/2003 |
| WO | WO2004006461 A1 | 1/2004 |
| WO | WO2007008981 | 1/2007 |
| WO | WO2007138375 | 12/2007 |
| WO | WO2008000905 | 1/2008 |
| WO | WO2008070777 | 6/2008 |
| WO | WO2010080669 | 7/2010 |
| WO | WO2011002795 A1 | 1/2011 |
| WO | WO2011006130 A1 | 1/2011 |
| WO | WO2011008557 A1 | 1/2011 |
| WO | WO2011061164 A2 | 5/2011 |

OTHER PUBLICATIONS

Bluetooth SIG, Inc. "Bluetooth Specification Version 3.0 + HS, Core System Package, Part B Baseband Specification", vol. 2 Apr. 21, 2009, pp. 68-85, XP002622397, Retrieved from the Internet: URL: http://www.bluetooth.com/Specification%20Documents/Core_V30_HS.zip.

Coen Bron, et al., Algorithm 457: Finding All Cliques of an Undirected Graph, Communications of the ACM, 16(9): 575-577, 1973.

F. Cazals, C. Karande, A note on the problem of reporting maximal cliques, Theoretical Computer Science, vol. 407, Issues 1-3, Nov. 6, 2008, pp. 564-568.

Hong, et al., "Exploring multiple radios and multiple channels in wireless mesh networks [Accepted from Open Call]", IEEE Wireless Communications, IEEE Service Center, Piscataway, NJ, US, vol. 17, No. 3, Jun. 1, 2010, pp. 76-85, XP011311811, ISSN: 1536-1284.

International Search Report and Written Opinion—PCT/US2010/038841, International Search Authority—European Patent Office—Oct. 18, 2010.

Juha B., et al.,"Slimbus: An Audio, Data and Control Interface for Mobile Devices" Conference: 29th International Conference: Audio for Mobile and Handheld Devices; Sep. 2006, AES, 60 East 42nd Street, Room 2520 New York 10165-2520, USA, Sep. 1, 2006, XP040507958 Section 2.6.

Ramachandran, et al., Interference-Aware Channel Assignment in Multi-Radio Wireless Mesh Networks , INFOCOM 2006, 25th IEEE International Conference on Computer Communications, Proceedings, IEEE Piscataway, NJ, Apr. 1, 2006, pp. 1-12, XP031072217, DOI: 10.1109/INFOCOM.2006.177, ISBN: 978-1-4244-0221-2.

Stefan Geirhofer, et al., "Cognitive frequency hopping based on interference prediction: theory and experimental results" Mobile Computing and Communications Review, ACM, New York, NY, US LNKD-DOI: 10.1145/1621076.1621082, vol. 13, No. 2, Apr. 1, 2009, pp. 49-61, XP001555779, ISSN: 1091-1669.

* cited by examiner

BT/WLAN State Arbitration

| | WLAN Active | WLAN BMPS | WLAN uAPSD | WLAN Scan | WLAN Connection Setup |
|---|---|---|---|---|---|
| BT Inquiry | BT takes priority. WLAN should suspend activity and move into BMPS | BT takes priority. WLAN should only listen to beacons if necessary to maintain the link | WLAN should ignore BT for delay sensitive traffic? Should UI deny BT? | BT takes priority WLAN will retry later. | BT takes priority WLAN will retry later. |
| BT paging (connection setup) | Same as above | Same as above | Same as above | Same as above | Same as above |
| BT page/ inquiry scan | WLAN will not be notified. WLAN must detect significant high priority traffic and switch to BMPS | BT takes priority | WLAN should ignore BT for delay sensitive traffic? | Same as above | WLAN takes priority and blocks all BT activity. |
| BT Sniff | BT takes priority. Minimal impact to WLAN. | Same as left | Same as left | Same as left | Same as above |
| BT SCO | See next slide | WLAN should take priority if some number of beacons are missed | See next slide | WLAN has priority | Same as above |
| BT ACL | See next slide | WLAN takes priority | See next slide | WLAN has priority | Same as above |
| BT SCO + ACL | See next slide | Same as above | See next slide | WLAN has priority | Same as above |

FIG. 4

|  | WLAN Active | WLAN uAPSD |
|---|---|---|
| BT SCO | All BT activity is high priority including retransmissions and ACL sniff<br>· Uplink<br>  · Existing HW PTA will give BT priority and WLAN HW will abort and retransmit<br>· Downlink<br>  · WLAN will use PSpoll or no AP control depending on conditions<br>  · For PSpoll, WLAN FW needs to maintain a timer to the next BT activity based on previous BT active rising edges and interval info from BT SW. WLAN FW should wait to detect activity in the eSCO retransmission window. Occasional packet loss due to ACL sniff is acceptable.<br>  · TBD if PMT or CTS techniques offer significant benefit | TBD |
| BT ACL (incl A2DP) | A majority of BT Traffic is low priority and can be delayed. Occasional high priority BT traffic will get priority.<br>· WLAN FW will create BT and WLAN transmission periods by toggling PTA promote BT low priority and ignore BT low priority modes<br>  · Transmission periods should be on the order of ~20ms<br>  · During WLAN transmission periods no low priority BT activity will be allowed<br>  · WLAN will send PMT to exit/enter power save at the beginning/end of each WLAN transmission period<br>  · WLAN should end the WLAN transmission period early if there is no activity for some duration (can be based on flow control)<br>· During BT transmission periods BT will always get priority<br>  · WLAN uplink operations are allowed if no BT activity is occurring<br>  · WLAN should end the WLAN transmission period early if there is no activity for some duration boundary to determine if no BT activity is occurring<br>  · WLAN should recognize that short BT periods do not indicate activity when BT is the slave<br>  · WLAN Should extend the BT period during A2DP as long as BT is actively using the channel up to some limit | TBD |
| BT SCO + ACL | Based on BT SCO mode. WLAN will additionally determine whether each gap should be utilized for WLAN or BT ACL.<br>· For WLAN gaps, WLAN will set the HW to ignore BT low priority and proceed as in BT SCO scenario.<br>· For BT ACL gaps, WLAN will ensure the AP is in power save mode and use promote BT to high priority mode | TBD |

FIG. 5

METHOD AND APPARATUS FOR DYNAMIC AND DUAL ANTENNA BLUETOOTH (BT)/WLAN COEXISTENCE

REFERENCE TO RELATED APPLICATION

This patent application claims priority to U.S. Provisional Patent Application Ser. No. 61/187,573 that was filed on Jun. 16, 2009 and assigned to the assignee hereof, and is hereby expressly incorporated by reference herein.

BACKGROUND

1. Field

The present work relates generally to wireless communications systems, methods, computer program products and devices, and more specifically to apparatus and methods for Bluetooth (BT) and Wireless Local Area Network (WLAN) coexistence. More particularly, the present work relates to dynamic and dual antenna Bluetooth and WLAN coexistence.

2. Background

In many telecommunication systems, communications networks are used to exchange messages among several interacting elements which are separated in space. There are many types of networks which may be classified in different aspects. In one example, the geographic scope of the network could be over a wide area, a metropolitan area, a local area, or a personal area, and the corresponding networks would be designated as wide area network (WAN), metropolitan area network (MAN), local area network (LAN), or personal area network (PAN). Networks also differ in the switching/routing technique used to interconnect the various network nodes and devices (e.g. circuit switching vs. packet switching), in the type of physical media employed for waveform propagation (e.g. wired vs. wireless), or in the set of communication protocols used (e.g. Internet protocol suite, SONET (Synchronous Optical Networking), Ethernet, etc.).

One important characteristic of communications networks is the choice of wired or wireless media for the transmission of electrical signals among the constituents of the network. In the case of wired networks, tangible physical media such as copper wire, coaxial cable, fiber optic cable, etc. are employed to propagate guided electromagnetic waveforms which carry message traffic over a distance. Wired networks are a traditional form of communications networks and are typically favored for interconnection of fixed network elements or for bulk data transfer. For example, fiber optic cables are often the preferred transmission media for very high throughput transport applications over long distances between large network hubs, for example, bulk data transport across or between continents over the Earth's surface.

On the other hand, in many cases, wireless networks are preferred when the network elements are mobile with dynamic connectivity or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks have the distinct advantage of facilitating user mobility and rapid field deployment compared to fixed wired networks. However, usage of wireless propagation requires significant active resource management among the network users and high levels of mutual coordination and cooperation for compatible spectrum utilization.

For example, popular wireless network technologies include Bluetooth (BT) and wireless local area networks (WLAN). Bluetooth and WLAN are both wireless communication protocols that are designed to provide connectivity to devices. Bluetooth and WLAN operate in the same frequency band.

Bluetooth is widely used to implement a personal area network (PAN) over very short distances, typically for a coverage area of a few meters radius, as an alternative to wired interconnection among local components. In one example, Bluetooth may be used to connect personal computers, personal digital assistants (PDA), mobile phones, wireless headsets, etc. Alternatively, a WLAN may be used to interconnect nearby devices together, employing widely used networking protocols such as WiFi or, more generally, a member of the IEEE 802.11 wireless protocol family.

One issue with wireless network technologies is that they often share the same frequency band for transmission. Thus, co-channel interference is a problem that must be actively managed. For example, both Bluetooth and WLAN systems may use the same unlicensed Industrial, Scientific, and Medical (ISM) spectral band located around two and four tenths GigaHertz (2.4 GHz). In one example, mobile devices may share a cost-effective common antenna which accesses both wireless technologies. To support user scenarios with simultaneous BT and WLAN operation, time division multiple access (TDMA) coexistence algorithms are required. Thus, a coexistence algorithm is needed to arbitrate usage between Bluetooth and WLAN access technologies for co-located wireless devices.

In common wireless practice, packet traffic arbitration (PTA) is used to implement coexistence among different access technologies. In one example, the PTA may be implemented through two, three or four wire interfaces between BT and WLAN electronic chips in a wireless device. Each access technology makes channel requests for individual packets with an optional priority indication for that request.

The PTA makes decisions on who gets access when both access technologies contend for a channel request simultaneously. This mechanism may prevent some collisions between the technologies for transmit traffic but does not prevent collisions between receive traffic. A collision is a conflict when two or more data sources attempt to transmit over the same medium at the same time. To prevent receive traffic collisions, the remote device transmissions are controlled by a protocol. In one example, if the wireless device is a BT master, it can control the BT receptions by choosing when to transmit polling frames to the remote device.

In another example, a device which follows a WLAN protocol is typically a client communicating with a wireless access point (AP). The AP transmissions may be controlled using existing power save operation and protection features. In one example, these features include transitioning in and out of power save mode, sending a power save mode poll to request a single packet, and requesting a send or clear signal to send packets to prevent other transmissions. Existing devices can use one of these WLAN techniques without having any information regarding the BT link.

There is a need in the art for a method and apparatus that is capable of effectively and efficiently arbitrating usage between Bluetooth and WLAN access technologies for co-located wireless devices.

SUMMARY

The present work discloses a state level arbitration method that effectively and efficiently arbitrates concurrent usage between WLAN and Bluetooth access technologies for co-located wireless devices. The present work also discloses a state level arbiter that determines state and relevant parameters of a WLAN module and of a Bluetooth module of a wireless transceiver unit. The state level arbiter uses the state and relevant parameters to determine which access technology (WLAN or Bluetooth) or combination of access technologies (WLAN or Bluetooth) will provide the best concurrent performance for wireless transmissions at a given time for specific Bluetooth states and WLAN states.

BRIEF DESCRIPTION OF THE DRAWINGS

Various aspects of a wireless communications system of the present work are illustrated by way of example, and not by way of limitation, in the accompanying drawings, wherein FIG. 1 illustrates that the transceiver unit also comprises a WLAN diversity receive (DRx) unit and a second antenna that is capable of being selectively coupled to the WLAN transmission (Tx) unit and to the WLAN diversity receiver (DRx) unit;

FIG. 4 illustrates a first schematic diagram showing elements of a state level arbitration algorithm of the present work;

FIG. 5 illustrates a second schematic diagram showing elements of a state level arbitration algorithm of the present work;

DETAILED DESCRIPTION

Figure 1:
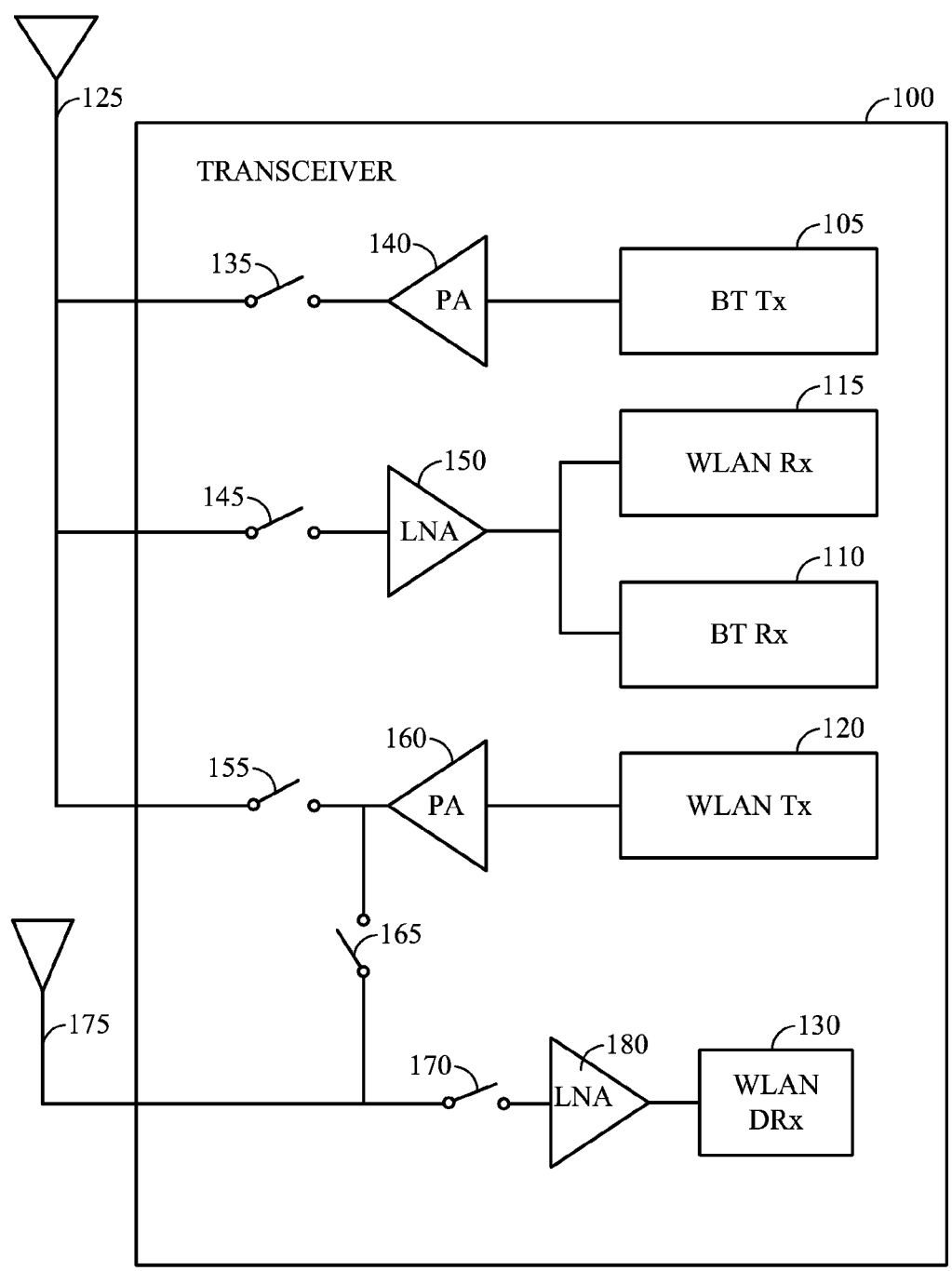
FIG. 1 illustrates a diagram of a portion of wireless communications transceiver unit that comprises a Bluetooth transmission (Tx) unit, and a Bluetooth receive (Rx) unit, and a WLAN receive (Rx) unit, and a WLAN transmission (Tx) unit and a first antenna that is capable of being selectively coupled to the four units.

The word "exemplary" is used herein to mean "serving as an example, instance, or illustration." Any embodiment described herein as "exemplary" is not necessarily to be construed as preferred or advantageous over other embodiments.

The present work discloses a BT/WLAN coexistence solution that uses a state level arbiter (SLA) in a wireless device that communicates with both Bluetooth (BT) and WLAN access technologies. As will be more fully described, the state level arbiter (SLA) determines the state and relevant parameters of both the Bluetooth access technology and the WLAN access technology. The state level arbiter (SLA) uses the state and relevant parameters to determine which technique (Bluetooth or WLAN) or combination of the two techniques will provide the best performance for the specific Bluetooth states and WLAN states at any given time.

In Bluetooth (BT), there are two connectivity types for transporting data over time slots in a time division scheme. The two types are asynchronous connectionless link (ACL) and synchronous connection oriented (SCO). ACL is a packet-oriented transmission mode without usage of reserved time slots. SCO, in contrast, is a circuit-oriented transmission mode which uses reserved time slots.

For example, when the BT state is in ACL sniff mode and is only performing occasional activities and when the WLAN state is in an active data transmission mode, the wireless device may use the PTA to allow the BT state activity at the expense of a few missed WLAN packets. In another example, when the BT state is in a SCO mode and the WLAN state is in an active data transmission mode, the wireless device may indicate to the WLAN AP that the device is in power save mode and may use power save polling frames during the gap between BT SCO activities to retrieve WLAN data.

In another example, when the BT state is in ACL data mode and the WLAN state is in an active data transmission mode, the state level arbiter (SLA) will adaptively allocate time periods to the BT and WLAN states. The BT activity is controlled by simply enabling or disabling the BT state. The WLAN activity is controlled by transitioning in and out of power save mode.

For cost and other reasons, typical devices share a common antenna for the two technologies. In order to support user scenarios where BT and WLAN operate simultaneously from a user perspective, time division multiple access (TDMA) algorithms that permit BT and WLAN to coexist are implemented.

However, performance improvement can be achieved by running the systems concurrently using separate antennas for BT and WLAN and designing the BT and WLAN RF circuits to accommodate the presence of a strong interfering technology within the same device. Additionally, changes in BT and WLAN power control responsive to the transmit power levels and receive power levels of each technology can be implemented to improve the range of conditions over which dual antenna concurrency is possible. The state level arbiter of the present work implements a high level algorithm to switch between dual antenna concurrency and traditional TDMA techniques responsive to the signal conditions and performance.

FIG. 1 illustrates a diagram of a portion of wireless communications transceiver unit 100 that comprises a Bluetooth transmission (Tx) unit 105, and a Bluetooth receive (Rx) unit 110, and a WLAN receive (Rx) unit 115, and a WLAN transmission (Tx) unit 120 and a first antenna 125 that is capable of being selectively coupled to the four units (105, 110, 115, 120). FIG. 1 illustrates that the transceiver unit 100 also comprises a WLAN diversity receive (DRx) unit 130 and a second antenna 175 that is capable of being selectively coupled to the WLAN transmission (Tx) unit 120 and to the WLAN diversity receiver (DRx) unit 130.

As shown in FIG. 1, the first antenna 125 may be coupled to the BT transmission (Tx) unit 105 through switch 135 and power amplifier 140. The first antenna 125 may also be coupled to the Bluetooth receive (Rx) unit 110 and to the WLAN receive (Rx) unit 115 through switch 145 and low noise amplifier (LNA) 150. The first antenna 125 may also be coupled to the WLAN transmission (Tx) unit 120 through switch 155 and power amplifier 160.

Two additional switches (switch 165 and switch 170) are required to support two antenna diversity. Second antenna 175 can be coupled to the WLAN receive (Rx) unit 120 through switch 165 and power amplifier 160. Second antenna 175 can also be coupled to the WLAN diversity receive (DRx)

unit 130 through switch 170 and low noise amplifier (LNA) 180. The switches (135, 145, 155, 165 and 170) of transceiver unit 100 are connected to and controlled by the state level arbiter (SLA) (not shown in FIG. 1).

Transceiver unit 100 may be operated with concurrent Bluetooth and WLAN systems using the first antenna 125 as the primary antenna 125 and the second antenna 175 as the diversity antenna 175. In this configuration, the primary antenna 125 is used solely for the Bluetooth transmission (Tx) signals from the Bluetooth transmission (Tx) unit 105 and the Bluetooth receive (Rx) signals from the Bluetooth receive (Rx) unit 110. The diversity antenna 175 is used for the WLAN transmission (Tx) signals from the WLAN transmission (Tx) unit 120 and the WLAN diversity receive (DRx) signals from the WLAN diversity receive (DRx) unit 130.

During concurrent operation with the two antennas (125 and 175), Bluetooth will use the primary antenna 125 and WLAN will use the diversity antenna 175. The WLAN diversity receive (DRx) unit 130 will use the diversity low noise amplifier (LNA) 180. Transmissions from the WLAN transmission (Tx) unit 120 will be routed to the diversity antenna 175 through power amplifier (PA) 160 and switch 165. The WLAN diversity receive (DRx) path baseband (BB) filter will increase from a third order to a fifth order. This will require an increase in area cost of about two tenths of a square millimeter (~0.2 mm$^2$). The automatic gain control (AGC) algorithms will be modified but the modifications will have no hardware impact.

Figure 2:
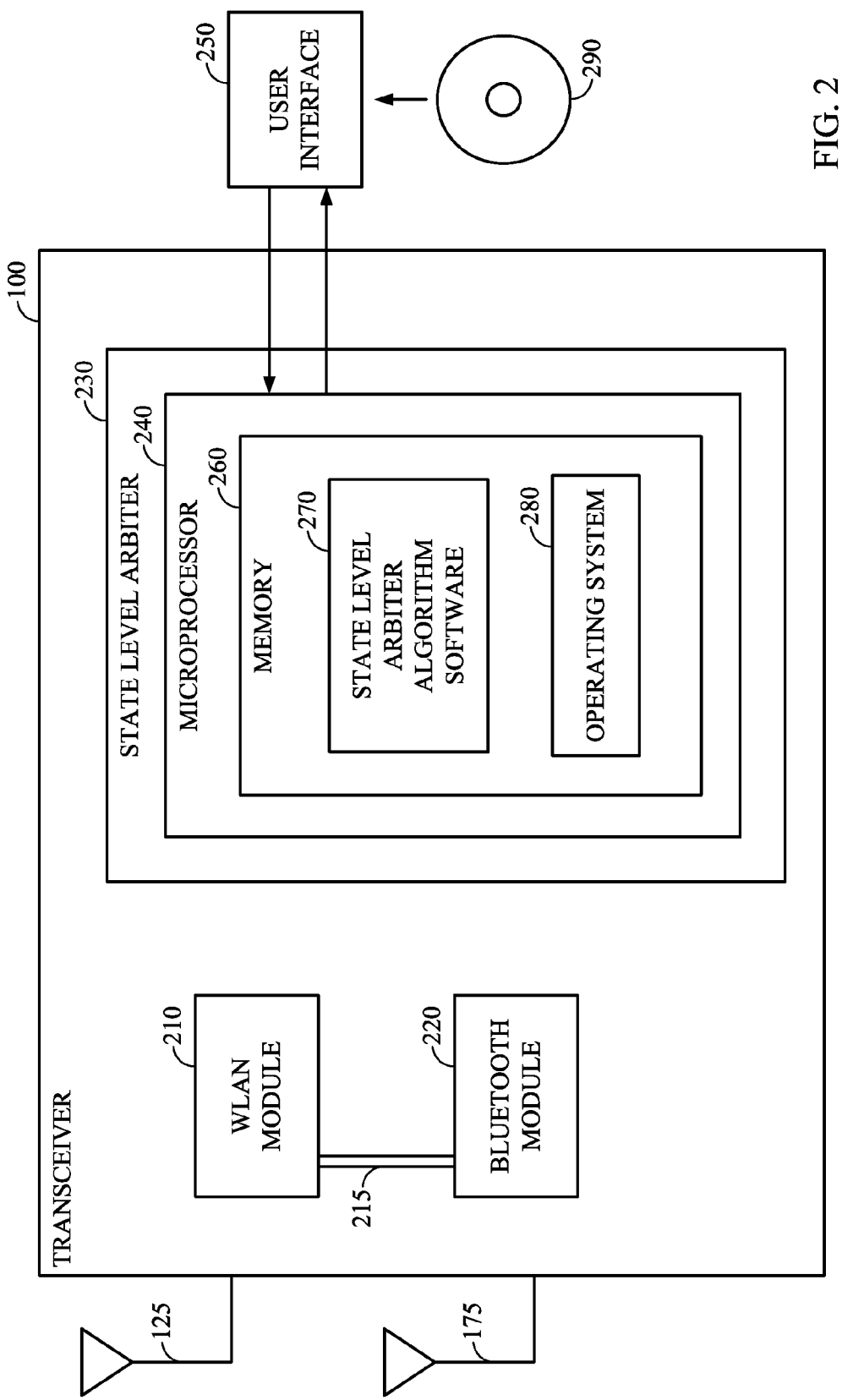
FIG. 2 illustrates a diagram of a portion of a wireless communications transceiver unit that comprises a WLAN module, and a Bluetooth module, and a state level arbiter (SLA) in accordance with the principles of the present work.

FIG. 2 illustrates a diagram of a portion of wireless communications transceiver unit 100 that comprises a WLAN module 210, and a Bluetooth module 220, and a state level arbiter (SLA) 230 in accordance with the principles of the present work. The various circuit components that comprise the WLAN circuitry in transceiver unit 100 are generally designated as WLAN module 210. Similarly, the various circuit components that comprise the Bluetooth circuitry in transceiver unit 100 are generally designated as Bluetooth module 220. The Bluetooth module 220 is coupled to the WLAN module 210 and is capable of communicating state information to the WLAN module 220 through signal lines 215.

The state level arbiter (SLA) 230 comprises a microprocessor 240. A user interface unit 250 is connected to the microprocessor 240. The user interface unit 250 allows user access to the microprocessor 240 of the state level arbiter (SLA) 230. The microprocessor 240 comprises a memory 260. The memory 260 comprises state level arbiter algorithm software 270 and an operating system 280. The microprocessor 240 of the state level arbiter (SLA) 230 receives information from the WLAN module 210 and from the Bluetooth module 220 via signal lines that are not shown in FIG. 2. The microprocessor 240 of the state level arbiter (SLA) 230 sends control signals to the WLAN module 210 and to the Bluetooth module 220 via control signal lines that are also not shown in FIG. 2.

Together the microprocessor 240 and the state level arbiter algorithm software 270 comprise a state level arbiter processor that is cable of carrying out the state level arbiter function for a transceiver unit 100 that comprises both a WLAN module 210 and a Bluetooth module 220. The state level arbiter algorithm software 270 carries out the method of the present work to select for a wireless transceiver the better access technology (WLAN or Bluetooth) or combination of the two access technologies (WLAN or Bluetooth) to perform a better concurrent transmission performance for specific Bluetooth states and WLAN states.

The wireless transceiver unit 100 is concurrently running two access technologies (Bluetooth and WLAN) for two different applications. The state level arbiter processor selects the appropriate access technology (or combination of the two access technologies) to provide the better concurrent performance in order to provide the best possible overall user experience. For example, assume that a first one of the access technologies is performing a web page download and that the second one of the access technologies is performing voice transmissions. Interrupting the voice transmissions is more detrimental than delaying a web page download. Therefore, the access technology that is performing the voice transmissions is given priority. This provides the better concurrent performance with respect to the two access technologies.

For another example, assume that a first one of the access technologies is attempting to establish a connection and that the second one of the access technologies is performing some other task. If priority is given to the second one of the access technologies, then the user will experience a connection failure. Therefore, the access technology that is attempting to establish a connection is given priority. This provides the better concurrent performance with respect to the two access technologies.

The state level arbiter algorithm software 270 comprises a computer program product for performing the method of the present work. The computer program product comprises a computer-readable medium that comprises code for carrying out computer instructions to perform the method. The computer program product is shown schematically in FIG. 2 as a computer-readable disk 290. The computer-readable disk 290 is merely illustrative of one type of computer program product. The computer program product may also comprise other types of computer-readable media such as magnetic tapes, hard drives, flash drives, and similar products.

Figure 3:
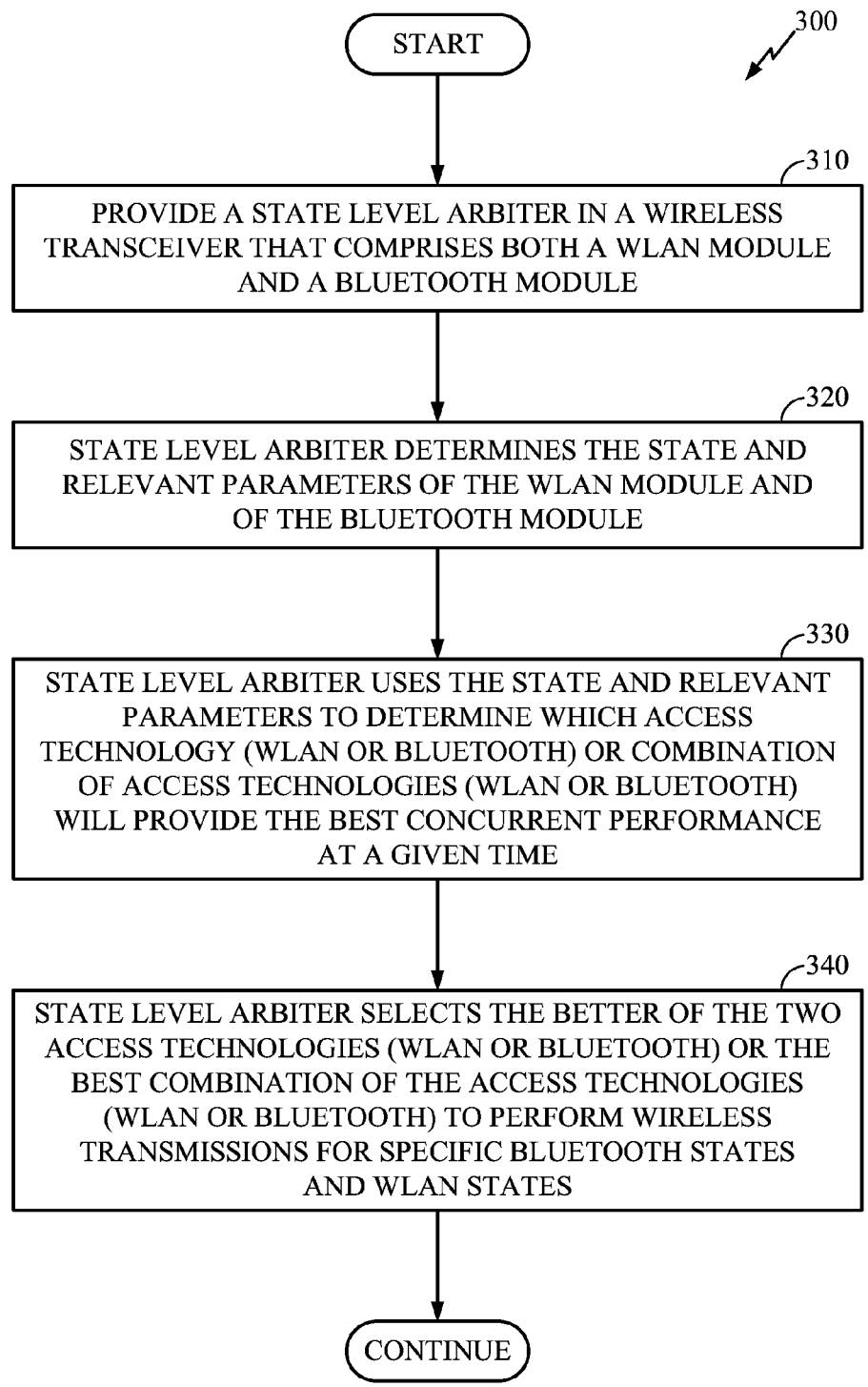
FIG. 3 illustrates a flow chart showing the steps of an advantageous embodiment of a method of the present work for performing state level arbitration in a transceiver unit that comprises both a WLAN module and a Bluetooth module.

FIG. 3 illustrates a flow chart 300 showing the steps of an advantageous embodiment of a method of the present work for performing state level arbitration in a wireless transceiver unit 100 that comprises both a WLAN module 210 and a Bluetooth module 220. In the first step a state level arbiter 230 is provided in a wireless transceiver unit 100 that comprises both a WLAN module 210 and a Bluetooth module 220 (step 310). The state level arbiter 230 determines the state and relevant parameters of the WLAN module 210 and of the Bluetooth module 220 (step 320).

The state level arbiter 230 uses the state and relevant parameters to determine which access technology (WLAN or Bluetooth) or combination of access technologies (WLAN or Bluetooth) will provide the best concurrent performance at a given time (step 330). The state level arbiter 230 selects the better of the two access technologies (WLAN or Bluetooth) or the best combination of the two access technologies (WLAN or Bluetooth) to perform wireless transmissions for specific Bluetooth states and WLAN states (step 340).

There are three main approaches to establishing WLAN-Bluetooth coexistence in a wireless transmitter. The first approach is time division multiplexing (TDM). In time division multiplexing (TDM) media access control (MAC) techniques are employed to allow only one system (either WLAN or Bluetooth) to operate at any given time. Packet traffic arbitration (PTA) is employed to control the transmission of the data packets. IEEE 802.11 features are used to control the timing of access point (AP) transmissions. In time division multiplexing (TDM) the maximum throughput that is possible is dictated by the percentage of time that a system (either WLAN or Bluetooth) has the transmission channel.

The second approach to establishing WLAN-Bluetooth coexistence in a wireless transmitter is Concurrency with Radio Frequency (RF) Isolation. This approach includes (1) separation in frequency, and (2) the reduction of interference between the transmitter of one technology and the receiver of the other technology. In one application the Concurrency with RF Isolation method is carried out using a single antenna and a programmable diplexer that switches the single antenna between the WLAN technology and the Bluetooth technology. In another application the Concurrency with RF Isolation method is carried out using a two antennas (sometimes referred to as a dual antenna) with good radio frequency (RF) isolation. Full standalone throughput can be achieved when the radio frequency (RF) isolation is sufficient for the given signal conditions.

The third approach to establishing WLAN-Bluetooth coexistence in a wireless transmitter is combines time division multiplexing (TDM) with Radio Frequency (RF) Isolation. This combined approach provides the best solution in the long run. Time division multiplexing (TDM) will be used when advanced frequency hopping (AFH) is not possible or when the frequencies that are used by advanced frequency hopping (AFH) overlap with the WLAN frequencies. Time division multiplexing (TDM) will also be used when the transmit power of one technology is strong and the receive power of the other technology is weak so that the resulting radio frequency (RF) isolation is insufficient.

Radio frequency (RF) isolation will be used in the third approach for the times when time division multiplexing (TDM) is not selected for use. The performance of the radio frequency (RF) isolation method is quantified by the range of practical conditions where the two systems (WLAN and Bluetooth) can operate at full concurrency.

As previously described, the state level arbiter 230 uses the state and relevant parameters to determine which access technology (WLAN or Bluetooth) or combination of access technologies (WLAN or Bluetooth) will provide the best performance at a given time. The state level arbiter 230 performs WLAN-Bluetooth state arbitration in accordance with the priority decisions that are set forth in the schematic diagrams in FIG. 4 and FIG. 5.

FIG. 4 illustrates a first schematic diagram showing elements of a state level arbitration algorithm of the present work. The diagram shows the priority decisions of the WLAN-Bluetooth state arbitration. For example, when the Bluetooth system sends a Bluetooth Inquiry and the state level arbiter 230 determines that the WLAN is active, the state level arbiter 230 will give priority to the Bluetooth system and suspend the WLAN activity. The text "See next slide" in the first schematic diagram means that reference should be made to the second schematic diagram that is shown in FIG. 5.

Figure 6:
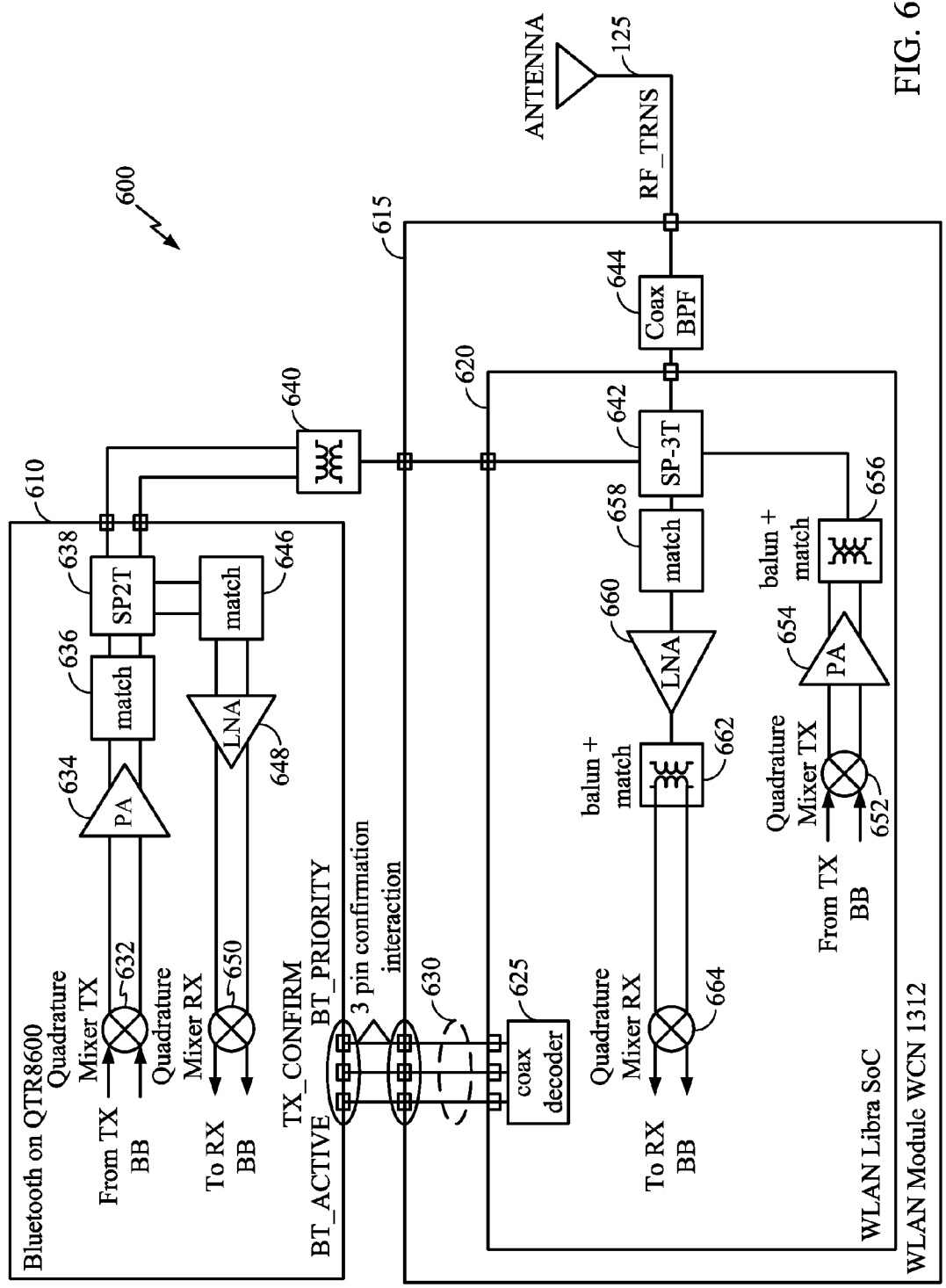
FIG. 6 illustrates a diagram of programmable diplexer in accordance with the principles of the present work for providing radio frequency (RF) isolation in which a single antenna is used.

FIG. 6 illustrates a diagram of programmable diplexer 600 in accordance with the principles of the present work for providing radio frequency (RF) isolation in which a single antenna is used. The programmable diplexer 600 comprises a Bluetooth module 610 and a WLAN module 615. As shown in FIG. 6, the WLAN module 615 comprises a WLAN Libra System on a Chip (SoC) module 620. The Bluetooth module 610 provides state information to a decoder 625 in the WLAN Libra SoC module 620 through signal lines 630. In one advantageous embodiment, signal lines 630 comprise a three (3) pin coexistence interface in which a first pin carries a BT_ACTIVE signal and a second pin carries a TX_CONFIRM signal and a third pin carries a BT_PRIORITY signal.

The Bluetooth transmission (Tx) path comprises quadrature mixer TX 632, power amplifier 634, match unit 636, single pole double throw (SP2T) switch 638, balun and match unit 640, single pole triple throw (SP3T) antenna switch 642, band pass filter (BPF) 644 and antenna 125. The Bluetooth receive (Rx) path comprises antenna 125, band pass filter (BPF) 644, single pole triple throw (SP3T) antenna switch 642, balun and match unit 640, single pole double throw (SP2T) switch 638, match unit 646, low noise amplifier (LNA) 648 and quadrature mixer RX 650.

The WLAN transmission (Tx) path comprises quadrature mixer TX 652, power amplifier 654, balun and match unit 656, single pole triple throw (SP3T) antenna switch 642, band pass filter (BPF) 644 and antenna 125. The WLAN receive (Rx) path comprises antenna 125, band pass filter (BPF) 644, single pole triple throw (SP3T) antenna switch 642, match unit 658, low noise amplifier (LNA) 660, balun and match unit 662 and quadrature mixer RX 664.

The operations of single pole double throw (SP2T) switch 638 and the operations of single pole triple throw (SP3T) antenna switch 642 are controlled by control signals from the state level arbiter 230. The control signals from the state level arbiter 230 to switch 638 and to switch 642 are carried by control signal lines that are not shown in FIG. 6.

Figure 7:
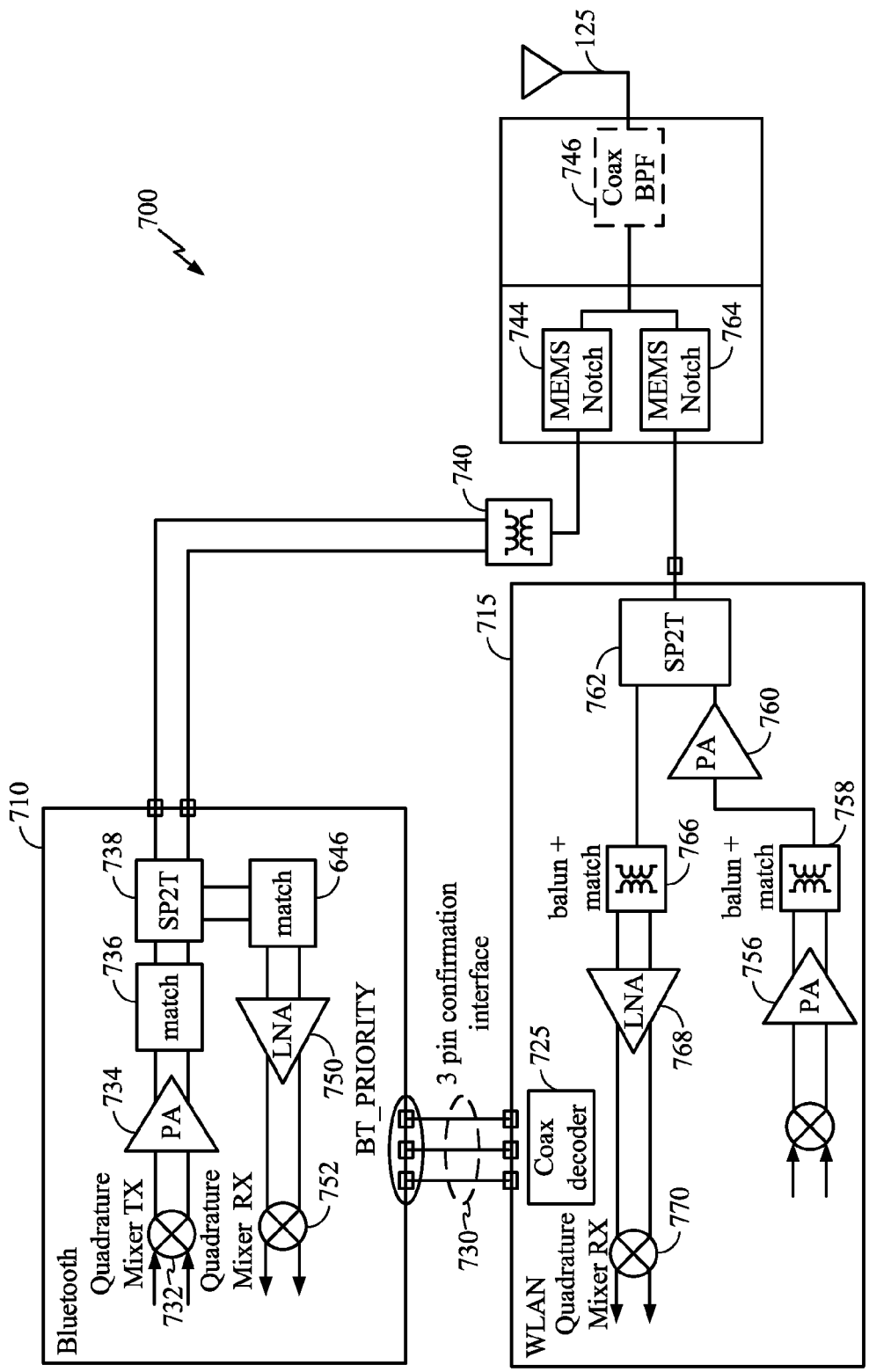
FIG. 7 illustrates a diagram of another programmable diplexer in accordance with the principles of the present work for providing radio frequency (RF) isolation in which a single antenna is used.

FIG. 7 illustrates a diagram of another programmable diplexer 700 in accordance with the principles of the present work for providing radio frequency (RF) isolation in which a single antenna is used. The programmable diplexer 700 comprises a Bluetooth module 710 and a WLAN module 715. The Bluetooth module 710 provides state information to a decoder 725 in the WLAN module 715 through signal lines 730. In one advantageous embodiment, signal lines 730 comprise a three (3) pin coexistence interface in which a first pin carries a BT_ACTIVE signal and a second pin carries a TX_CONFIRM signal and a third pin carries a BT_PRIORITY signal.

The Bluetooth transmission (Tx) path comprises quadrature mixer TX 732, power amplifier 734, match unit 736, single pole double throw (SP2T) switch 738, balun and match unit 740, first micro-electromechanical (MEMs) device notch 744, band pass filter (BPF) 746 and antenna 125. The Bluetooth receive (Rx) path comprises antenna 125, band pass filter (BPF) 746, first micro-electromechanical (MEMs) device notch 744, balun and match unit 740, single pole double throw (SP2T) switch 738, match unit 748, low noise amplifier (LNA) 750 and quadrature mixer RX 752.

The WLAN transmission (Tx) path comprises quadrature mixer TX 754, power amplifier 756, balun and match unit 758, power amplifier 760, single pole double throw (SP2T) switch 762, second micro-electromechanical (MEMs) device notch 764, band pass filter (BPF) 746 and antenna 125. The WLAN receive (Rx) path comprises antenna 125, band pass filter (BPF) 746, second micro-mechanical (MEMs) device notch 764, single pole double throw (SP2T) switch 762, balun and match unit 766, low noise amplifier (LNA) 768, and quadrature mixer RX 770.

The operations of single pole double throw (SP2T) switch 738 and the operations of single pole double throw (SP2T) switch 762 are controlled by control signals from the state level arbiter 230. The control signals from the state level arbiter 230 to switch 738 and to switch 762 are carried by control signal lines that are not shown in FIG. 7.

In addition, state level arbiter 230 controls the operation of the first micro-electromechanical (MEMs) device notch 744 and the operation of the second micro-electromechanical (MEMs) device notch 764. Each of the micro-electromechanical (MEMs) device notches (744 and 764) is programmable by the state level arbiter 230. This means that the programmable diplexer 700 is totally reconfigurable if the WLAN band of operation is changed. In the case of Bluetooth or WLAN operation, one or the other, the MEMs device notch in the path that is not used will be programmed to be high impedance. Programming a MEMs device notch to be high impedance can be achieved in one of two ways.

Method One. In the case of WLAN only, the MEMs device notch in the Bluetooth path can remain unchanged as it would already be high impedance. It may be possible, however, to make the value of impedance even higher as in this case, there is no requirement on a low insertion loss for the Bluetooth (i.e., the Bluetooth is off). In the case of Bluetooth only, the reverse is true.

Method Two. The MEMs device notch can be programmed to be much wider and deeper to that it is higher impedance and a better open circuit.

The basis behind the programming of a MEMs device notch in single operation is to make the programmable diplexer 700 operate more like a switch. Having the MEMs device notch operate more like a switch is single operation means that time share operation may also be used.

Figure 8:
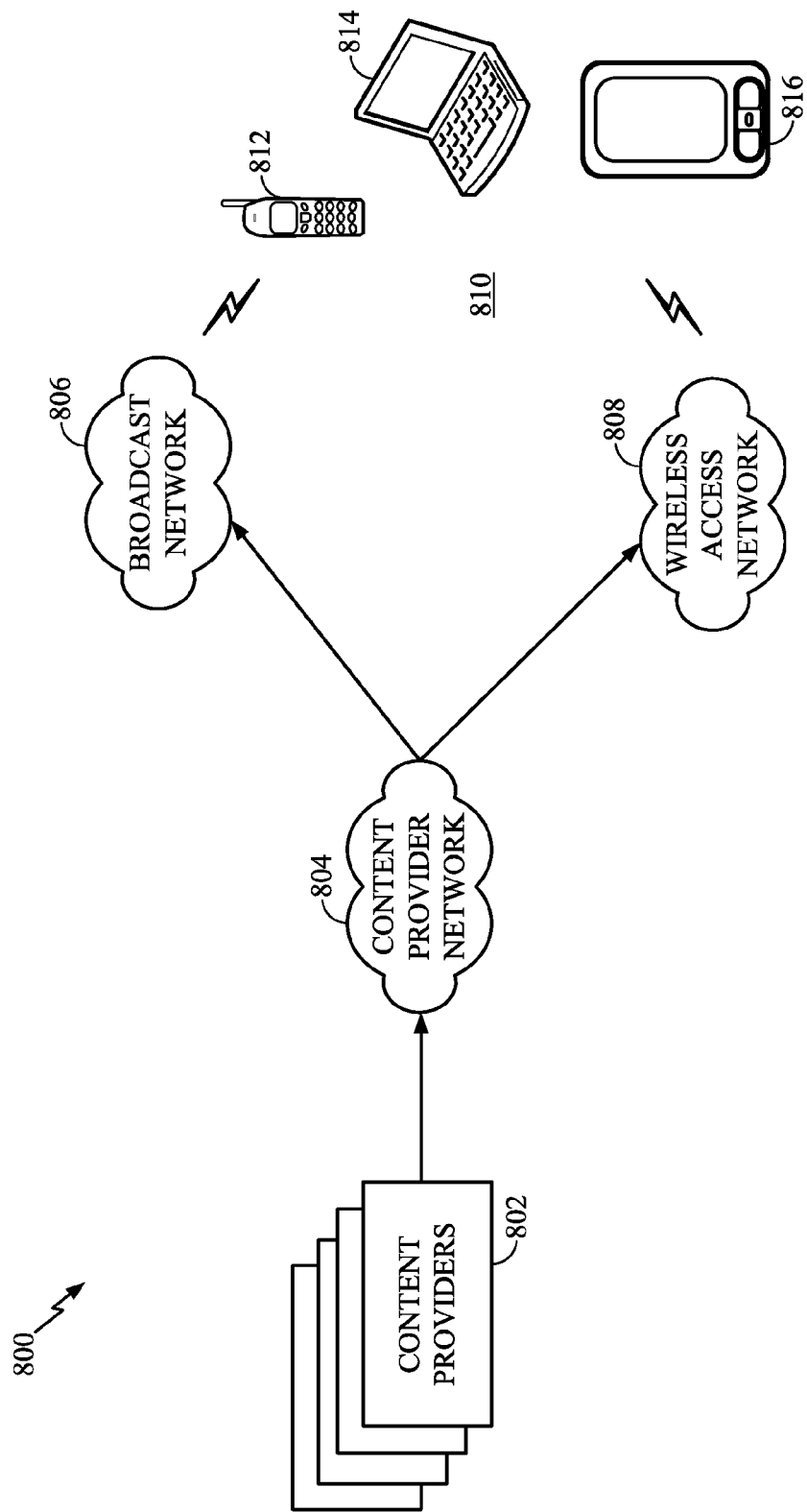
FIG. 8 illustrates a communications system in which principles according to the present work may be incorporated.

FIG. 8 illustrates a communications system 800 in which principles according to the present work may be incorporated. In general, the system 800 creates and broadcasts multimedia content across various networks to a large number of mobile subscribers. The communications system 800 includes any number of content providers 802, a content provider network 804, a broadcast network 806, and a wireless access network 808. The communications system 800 is also shown with a number of devices 810 used by mobile subscribers to receive multimedia content. These devices 810 include a mobile telephone 812, a laptop computer 814, and a person digital assistant (PDS) 816. The devices 810 illustrate just some of the devices that are suitable for use in the communications system 800. It should be noted that although three devices are shown in FIG. 8, virtually any number of analogous devices or types of devices are suitable for use in the communications system 800, as would be apparent to those skilled in the art.

The content providers 802 provide content for distribution to mobile subscribers in the communications system 800. The content may include video, audio, multimedia content, clips, real-time and non real-time content, scripts, programs, data or any other type of suitable content. The content providers 802 provide content to the content provider network for wide-area or local-area distribution.

The content provider network 804 comprises any combination of wired and wireless networks that operate to distribute content for delivery to mobile subscribers. In the example illustrated in FIG. 8, the content provider network 804 distributes content through a broadcast network 806. The broadcast network 806 comprises any combination of wired and wireless proprietary networks that are designed to broadcast high quality content. These proprietary networks may be distributed throughout a large geographic region to provide seamless coverage to mobile devices. Typically, the geographic region will be divided into sectors with each sector providing access to wide-area and local-area content.

The content provider network 804 may also include a content server (not shown) for distribution of content through a wireless access network 808. The content server communicates with a base station controller (BSC) (not shown) in the wireless access network 808. The BSC may be used to manage and control any number of base transceiver stations (BTSs) (not shown) depending on the geographic reach of the wireless access network 808. The BTSs provide access to wide-area and local-area for the various devices 810.

The multimedia content broadcast by the content providers 802 include one or more services. A service is an aggregation of one or more independent data components. Each independent data component of a service is called a flow. By way of example, a cable news service may include three flows: a video flow, an audio flow, and a control flow.

Services are carried over one or more logical channels. In Forward Link Only (FLO) Air Interface applications, a logical channel is often referred to as a Multicast Logical Channel (MLC). A logical channel may be divided into multiple logical sub-channels. These logical sub-channels are called streams. Each flow is carried in a single stream. The content for a logical channel is transmitted through the various networks in a physical frame. In Forward Link Only (FLO) Air Interface applications, the physical frame is often referred to as a superframe.

The air interface used to transmit the physical frames to the various devices 810 shown in FIG. 8 may vary depending on the specific application and the overall design constraints. In general, communications systems employing Forward Link Only (FLO) technology utilize Orthogonal Frequency Division Multiplexing (OFDM), which is also utilized by Digital Audio Broadcasting (DAB), Terrestrial Digital Video Broadcasting (DVB-T), and Terrestrial Integrated Services Digital Broadcasting (ISDB-T). OFDM is a multi-carrier modulation technique that effectively partitions the overall system bandwidth into multiple (N) sub-carriers. These sub-carriers, which are also referred to as tones, bins, frequency channels, etc., are spaced apart at precise frequencies to provide orthogonality. Content may be modulated onto the sub-carriers by adjusting each sub-carrier's phase, amplitude or both. Typically, quadrature phase shift keying (QPSK) or quadrature amplitude modulation (QAM) is used, but other modulation schemes may also be used.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present work.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside on an ASIC. The ASIC may reside in a user terminal. In the alternative, the processor and the storage medium may reside as discrete components in a user terminal.

The description set forth in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

One skilled in the art would understand that the steps disclosed in the example algorithms can be interchanged in their order without departing from the scope and spirit of the present disclosure. Also, one skilled in the art would understand that the steps illustrated in the example algorithms are not exclusive and other steps may be included or one or more of the steps in the example algorithms may be deleted without affecting the scope and spirit of the present disclosure.

What is claimed is:

1. A method for arbitrating usage between a Bluetooth module and a Wireless Local Area Network (WLAN) module within a wireless transceiver unit wherein the method comprises the steps of:
    providing within the wireless transceiver unit a state level arbiter that is coupled to the Bluetooth module and that is coupled to the WLAN module;
    providing within the wireless transceiver unit a packet level arbiter that is coupled to the Bluetooth module and that is coupled to the WLAN module;
    determining within the state level arbiter state parameters and relevant parameters of the Bluetooth module and of the WLAN module;
    determining within the state level arbiter a configuration of the packet level arbiter that arbitrates between the Bluetooth module and the WLAN module on a packet by packet basis;
    determining within the state level arbiter whether the Bluetooth module or the WLAN module provides a better concurrent performance at a given time;
    selecting with the state level arbiter one of: (1) the Bluetooth module and (2) the WLAN module wherein the selected module provides the better concurrent performance at a given time and
    performing wireless transmissions with the wireless transceiver unit for specific Bluetooth states and for specific WLAN states using the selected module.

2. The method as set forth in claim 1 further comprising the step of:
    determining within the state level arbiter whether a combination of the Bluetooth module and the WLAN module provides a better concurrent performance at a given time.

3. The method as set forth in claim 2 further comprising the steps of:
    selecting with the state level arbiter one of: (1) the Bluetooth module and (2) the WLAN module and (3) a combination of the Bluetooth module and the WLAN module wherein one of the selected module and the selected combination provides a better concurrent performance at a given time; and
    performing wireless transmissions with the wireless transceiver unit for specific Bluetooth states and for specific WLAN states using the selected module or selected combination.

4. The method as set forth in claim 1 further comprising the steps of:
    utilizing the state level arbiter to select one of: (1) a dual antenna concurrency technique and (2) a time division multiplex (TDM) technique wherein the selected technique provides a better concurrent performance at a given time; and
    performing wireless transmissions with the wireless transceiver unit for specific Bluetooth states and for specific WLAN states using the selected technique.

5. The method as set forth in claim 1 further comprising the steps of:
    providing within the wireless transceiver unit a primary antenna;
    transmitting and receiving Bluetooth signals via the primary antenna;
    providing within the wireless transceiver unit a diversity antenna; and
    transmitting and receiving WLAN signals via the diversity antenna.

6. The method as set forth in claim 1 further comprising the steps of:
    providing within the wireless transceiver unit a primary antenna;
    providing within the wireless transceiver a programmable diplexer that comprises the Bluetooth module and the WLAN module;
    coupling the programmable diplexer to the primary antenna and to the state level arbiter; and
    controlling at least one operation of the programmable diplexer with the state level arbiter.

7. An apparatus for arbitrating usage between a Bluetooth module and a Wireless Local Area Network (WLAN) module within a wireless transceiver unit wherein the apparatus comprises:
- means for providing within the wireless transceiver unit a state level arbiter that is coupled to the Bluetooth module and that is coupled to the WLAN module;
- means for providing within the wireless transceiver unit a packet level arbiter that is coupled to the Bluetooth module and that is coupled to the WLAN module;
- means for determining within the state level arbiter state parameters and relevant parameters of the Bluetooth module and of the WLAN module;
- means for determining within the state level arbiter a configuration of the packet level arbiter that arbitrates between the Bluetooth module and the WLAN module on a packet by packet basis;
- means for determining within the state level arbiter whether the Bluetooth module or the WLAN module provides a better concurrent performance at a given time;
- means for selecting with the state level arbiter one of: (1) the Bluetooth module and (2) the WLAN module wherein the selected module provides the better concurrent performance at a given time; and
- means for performing wireless transmissions with the wireless transceiver unit for specific Bluetooth states and for specific WLAN states using the selected module.

8. The apparatus as set forth in claim 7 further comprising:
- means for determining within the state level arbiter whether a combination of the Bluetooth module and the WLAN module provides a better concurrent performance at a given time.

9. The apparatus as set forth in claim 8 further comprising:
- means for selecting with the state level arbiter one of: (1) the Bluetooth module and (2) the WLAN module and (3) a combination of the Bluetooth module and the WLAN module wherein one of the selected module and the selected combination provides a better concurrent performance at a given time; and
- means for performing wireless transmissions with the wireless transceiver unit for specific Bluetooth states and for specific WLAN states using the selected module or selected combination.

10. The apparatus as set forth in claim 7 further comprising:
- means for utilizing the state level arbiter to select one of: (1) a dual antenna concurrency technique and (2) a time division multiplex (TDM) technique wherein the selected technique provides a better concurrent performance at a given time; and
- means for performing wireless transmissions with the wireless transceiver unit for specific Bluetooth states and for specific WLAN states using the selected technique.

11. The apparatus as set forth in claim 7 further comprising:
- a primary antenna coupled to the wireless transceiver unit;
- means for transmitting and receiving Bluetooth signals via the primary antenna;
- a diversity antenna coupled to the wireless transceiver unit; and
- means for transmitting and receiving WLAN signals via the diversity antenna.

12. The apparatus as set forth in claim 7 further comprising:
- a primary antenna coupled to the wireless transceiver unit;
- a programmable diplexer within the wireless transceiver that comprises the Bluetooth module and the WLAN module;
- wherein the programmable diplexer is coupled to the primary antenna and to the state level arbiter; and
- means for controlling at least one operation of the programmable diplexer with the state level arbiter.

13. A computer program product for arbitrating usage between a Bluetooth module and a Wireless Local Area Network (WLAN) module within a wireless transceiver unit wherein the computer program product comprises:
a non-transitory computer-readable medium comprising:
- (a) code for providing within the wireless transceiver unit a state level arbiter that controls the Bluetooth module and that controls the WLAN module;
- (b) code for providing within the wireless transceiver unit a packet level arbiter that arbitrates between the Bluetooth module and the WLAN module on a packet by packet basis;
- (c) code for determining within the state level arbiter state parameters and relevant parameters of the Bluetooth module and of the WLAN module;
- (d) code for determining within the state level arbiter a configuration of the packet level arbiter that arbitrates between the Bluetooth module and the WLAN module on a packet by packet basis;
- (e) code for determining within the state level arbiter whether the Bluetooth module or the WLAN module provides a better concurrent performance at a given time;
- (f) code for selecting with the state level arbiter one of: (1) the Bluetooth module and (2) the WLAN module wherein the selected module provides the better concurrent performance at a given time; and
- (g) code for performing wireless transmissions with the wireless transceiver unit for specific Bluetooth states and for specific WLAN states using the selected module.

14. The computer program product as set forth in claim 13 wherein the non-transitory computer-readable medium further comprises:
- (d) code for determining within the state level arbiter whether a combination of the Bluetooth module and the WLAN module provides a better concurrent performance at a given time.

15. The computer program product as set forth in claim 14 wherein the non-transitory computer-readable medium further comprises:
- code for selecting with the state level arbiter one of: (1) the Bluetooth module and (2) the WLAN module and (3) a combination of the Bluetooth module and the WLAN module wherein one of the selected module and the selected combination provides a better concurrent performance at a given time; and
- code for performing wireless transmissions with the wireless transceiver unit for specific Bluetooth states and for specific WLAN states using the selected module or selected combination.

16. The computer program product as set forth in claim 13 wherein the non-transitory computer-readable medium further comprises:
- code for causing the state level arbiter to select one of: (1) a dual antenna concurrency technique and (2) a time division multiplex (TDM) technique wherein the selected technique provides a better concurrent performance at a given time; and
- code for performing wireless transmissions with the wireless transceiver unit for specific Bluetooth states and for specific WLAN states using the selected technique.

17. The computer program product as set forth in claim 13 wherein the non-transitory computer-readable medium further comprises:
- code for operating the wireless transceiver unit with a primary antenna;
- code for transmitting and receiving Bluetooth signals via the primary antenna;
- code for operating the wireless transceiver unit with a diversity antenna; and
- code for transmitting and receiving WLAN signals via the diversity antenna.

18. The computer program product as set forth in claim 13 wherein the non-transitory computer-readable medium further comprises:
- code for operating the wireless transceiver unit with a primary antenna;
- code for operating within the wireless transceiver a programmable diplexer that comprises the Bluetooth module and the WLAN module;
- code for operating the programmable diplexer when the programmable diplexer is coupled to the primary antenna and to the state level arbiter; and
- code for controlling at least one operation of the programmable diplexer with the state level arbiter.

19. A method for arbitrating usage between a Bluetooth module and a Wireless Local Area Network (WLAN) module within a wireless transceiver unit wherein the method comprises the steps of:
- providing within the wireless transceiver unit a state level arbiter that is coupled to the Bluetooth module and that is coupled to the WLAN module;
- providing within the wireless transceiver unit a packet level arbiter that is coupled to the Bluetooth module and that is coupled to the WLAN module;
- determining within the state level arbiter state parameters and relevant parameters of the Bluetooth module and of the WLAN module;
- determining within the state level arbiter a configuration of the packet level arbiter that arbitrates between the Bluetooth module and the WLAN module on a packet by packet basis;
- choosing from among choices consisting of the Bluetooth module, the WLAN module, or a combination thereof based upon a predetermined selection criterion/criteria;
- selecting with the state level arbiter one of: (1) the Bluetooth module and (2) the WLAN module wherein the selected module provides the better concurrent performance at a given time; and
- performing wireless transmissions with the wireless transceiver unit for specific Bluetooth states and for specific WLAN states using the selected module.

20. The method as set forth in claim 19 further comprising the steps of:
- utilizing the state level arbiter to select one of: (1) a dual antenna concurrency technique and (2) a time division multiplex (TDM) technique; and
- performing wireless transmissions with the wireless transceiver unit for specific Bluetooth states and for specific WLAN states using the selected technique.

21. The method as set forth in claim 19 further comprising the steps of:
- providing within the wireless transceiver unit a primary antenna;
- transmitting and receiving Bluetooth signals via the primary antenna;
- providing within the wireless transceiver unit a diversity antenna; and
- transmitting and receiving WLAN signals via the diversity antenna.

22. The method as set forth in claim 19 further comprising the steps of:
- providing within the wireless transceiver unit a primary antenna;
- providing within the wireless transceiver a programmable diplexer that comprises the Bluetooth module and the WLAN module;
- coupling the programmable diplexer to the primary antenna and to the state level arbiter; and
- controlling at least one operation of the programmable diplexer with the state level arbiter.

23. An apparatus for arbitrating usage between a Bluetooth module and a Wireless Local Area Network (WLAN) module within a wireless transceiver unit wherein the apparatus comprises:
- a state level arbiter that is coupled to the Bluetooth module and that is coupled to the WLAN module;
- a packet level arbiter that is coupled to the Bluetooth module and that is coupled to the WLAN module;
- a processor for determining, within the state level arbiter, state parameters and relevant parameters of the Bluetooth module and of the WLAN module, wherein said processor determines within the state level arbiter a configuration of the packet level arbiter that arbitrates between the Bluetooth module and the WLAN module on a packet by packet basis; wherein said processor further selects one or more modules for communications among the Bluetooth module, the WLAN module, and a combination thereof, based upon a predetermined selection criterion/criteria; wherein said processor further selects with the state level arbiter one of: (1) the Bluetooth module and (2) the WLAN module wherein the selected module provides the better concurrent performance at a given time; and wherein said processor performs wireless transmissions with the wireless transceiver unit for specific Bluetooth states and for specific WLAN states using the selected module.

24. A method for arbitrating usage between a Bluetooth module and a Wireless Local Area Network (WLAN) module within a wireless transceiver unit wherein the method comprises the steps of:
- providing within the wireless transceiver unit a state level arbiter that is coupled to the Bluetooth module and that is coupled to the WLAN module;
- providing within the wireless transceiver unit a packet level arbiter that is coupled to the Bluetooth module and that is coupled to the WLAN module;
- determining within the state level arbiter state parameters and relevant parameters of the Bluetooth module and of the WLAN module;
- determining within the state level arbiter a configuration of the packet level arbiter that arbitrates between the Bluetooth module and the WLAN module on a packet by packet basis;
- determining priority for one of the wireless activity of the Bluetooth module and the wireless activity of the WLAN module based upon the state level arbiter state parameters and relevant parameters of the Bluetooth module and of the WLAN module;
- selecting with the state level arbiter one of: (1) the Bluetooth module and (2) the WLAN module wherein the selected module provides the better concurrent performance at a given time; and performing wireless transmissions with the wireless transceiver unit for specific Bluetooth states and for specific WLAN states using the selected module.

25. The method as set forth in claim 24 wherein the step of determining priority for one of the wireless activity of the Bluetooth module and the wireless activity of the WLAN module comprises the steps of:
receiving in the state level arbiter one of: a Bluetooth inquiry and a Bluetooth paging from the Bluetooth module;
determining in the state level arbiter that the WLAN module is active; and
giving priority to the wireless activity of the Bluetooth module.

26. The method as set forth in claim 24 wherein the step of determining priority for one of the wireless activity of the Bluetooth module and the wireless activity of the WLAN module comprises the steps of:
receiving in the state level arbiter one of: a Bluetooth page/inquiry scan and a Bluetooth Sniff from the Bluetooth module;
determining in the state level arbiter that the WLAN module is active; and
giving priority to the wireless activity of the Bluetooth module.

27. The method as set forth in claim 24 wherein the step of determining priority for one of the wireless activity of the Bluetooth module and the wireless activity of the WLAN module comprises the steps of:
receiving in the state level arbiter a Bluetooth SCO from the Bluetooth module;
determining in the state level arbiter that the WLAN module is active; and
giving priority to the wireless activity of the Bluetooth module.

28. The method as set forth in claim 24 wherein the step of determining priority for one of the wireless activity of the Bluetooth module and the wireless activity of the WLAN module comprises the steps of:
receiving in the state level arbiter a Bluetooth ACL from the Bluetooth module;
determining in the state level arbiter that the WLAN module is active;
giving priority to the wireless activity of the WLAN module; and
giving priority to the wireless activity of the Bluetooth module only when the Bluetooth activity is designated with a high priority.

29. The method as set forth in claim 24 wherein the step of determining priority for one of the wireless activity of the Bluetooth module and the wireless activity of the WLAN module comprises the steps of:
receiving in the state level arbiter one of: a Bluetooth inquiry, a Bluetooth paging, a Bluetooth page/inquiry scan and a BT Sniff from the Bluetooth module;
determining in the state level arbiter that the WLAN module is in WLAN scan mode; and
giving priority to the wireless activity of the Bluetooth module.

30. The method as set forth in claim 24 wherein the step of determining priority for one of the wireless activity of the Bluetooth module and the wireless activity of the WLAN module comprises the steps of:
receiving in the state level arbiter one of: a Bluetooth SCO, a Bluetooth ACL and a Bluetooth SCO+ACL from the Bluetooth module;
determining in the state level arbiter that the WLAN module is in WLAN scan mode; and
giving priority to the wireless activity of the WLAN module.

31. The method as set forth in claim 24 wherein the step of determining priority for one of the wireless activity of the Bluetooth module and the wireless activity of the WLAN module comprises the steps of:
receiving in the state level arbiter one of: a Bluetooth inquiry and a Bluetooth paging from the Bluetooth module;
determining in the state level arbiter that the WLAN module is in WLAN connection setup mode; and
giving priority to the wireless activity of the Bluetooth module.

32. The method as set forth in claim 24 wherein the step of determining priority for one of the wireless activity of the Bluetooth module and the wireless activity of the WLAN module comprises the steps of:
receiving in the state level arbiter one of: a Bluetooth page/inquiry scan, a Bluetooth Sniff, a Bluetooth SCO, a Bluetooth ACL and a Bluetooth SCO+ACL from the Bluetooth module;
determining in the state level arbiter that the WLAN module is in WLAN connection setup mode; and
giving priority to the wireless activity of the WLAN module.

33. The method as set forth in claim 24 wherein the step of determining priority for one of the wireless activity of the Bluetooth module and the wireless activity of the WLAN module comprises the steps of:
receiving in the state level arbiter one of: a Bluetooth inquiry, a Bluetooth paging, a Bluetooth page/inquiry scan and a Bluetooth Sniff from the Bluetooth module;
determining in the state level arbiter that the WLAN module is in WLAN BMPS mode; and
giving priority to the wireless activity of the Bluetooth module.

34. The method as set forth in claim 24 wherein the step of determining priority for one of the wireless activity of the Bluetooth module and the wireless activity of the WLAN module comprises the steps of:
receiving in the state level arbiter one of: a Bluetooth SCO and a Bluetooth ACL and a Bluetooth SCO+ACL from the Bluetooth module;
determining in the state level arbiter that the WLAN module is in WLAN BMPS mode; and
giving priority to the wireless activity of the WLAN module.

35. The method as set forth in claim 24 wherein the step of determining priority for one of the wireless activity of the Bluetooth module and the wireless activity of the WLAN module comprises the steps of:
receiving in the state level arbiter one of: a Bluetooth inquiry, a Bluetooth paging and a Bluetooth page/inquiry scan from the Bluetooth module;
determining in the state level arbiter that the WLAN module is in WLAN uAPSD mode; and
giving priority to the wireless activity of the WLAN module.

36. The method as set forth in claim 24 wherein the step of determining priority for one of the wireless activity of the Bluetooth module and the wireless activity of the WLAN module comprises the steps of:
receiving in the state level arbiter a Bluetooth Sniff from the Bluetooth module;

determining in the state level arbiter that the WLAN module is in WLAN uAPSD mode; and giving priority to the wireless activity of the Bluetooth module.

37. A computer program product for arbitrating usage between a Bluetooth module and a Wireless Local Area Network (WLAN) module within a wireless transceiver unit wherein the computer program product comprises:

a non-transitory computer-readable medium comprising:
(a) code for providing within the wireless transceiver unit a state level arbiter that controls the Bluetooth module and that controls the WLAN module;
(b) code for providing within the wireless transceiver unit a packet level arbiter that arbitrates between the Bluetooth module and the WLAN module on a packet by packet basis;
(c) code for determining within the state level arbiter state parameters and relevant parameters of the Bluetooth module and of the WLAN module;
(d) code for determining within the state level arbiter a configuration of the packet level arbiter that arbitrates between the Bluetooth module and the WLAN module on a packet by packet basis;
(e) code for determining priority for one of the wireless activity of the Bluetooth module and the wireless activity of the WLAN module based upon the state level arbiter state parameters and relevant parameters of the Bluetooth module and of the WLAN module
(f) code for selecting with the state level arbiter one of: (1) the Bluetooth module and (2) the WLAN module wherein the selected module provides the better concurrent performance at a given time; and
(g) code for performing wireless transmissions with the wireless transceiver unit for specific Bluetooth states and for specific WLAN states using the selected module.

38. The computer program product as set forth in claim 37 wherein the code for determining priority for one of the wireless activity of the Bluetooth module and the wireless activity of the WLAN module in the non-transitory computer-readable medium further comprises:

code for receiving in the state level arbiter one of: a Bluetooth inquiry and a Bluetooth paging from the Bluetooth module;

code for determining in the state level arbiter that the WLAN module is active; and code for giving priority to the wireless activity of the Bluetooth module.

39. The computer program product as set forth in claim 37 wherein the code for determining priority for one of the wireless activity of the Bluetooth module and the wireless activity of the WLAN module in the non-transitory computer-readable medium further comprises:

code for receiving in the state level arbiter one of: a Bluetooth page/inquiry scan and a Bluetooth Sniff from the Bluetooth module;

code for determining in the state level arbiter that the WLAN is active; and code for giving priority to the wireless activity of the Bluetooth module.

40. The computer program product as set forth in claim 37 wherein the code for determining priority for one of the wireless activity of the Bluetooth module and the wireless activity of the WLAN module in the non-transitory computer-readable medium further comprises:

code for receiving in the state level arbiter a Bluetooth SCO from the Bluetooth module;

code for determining in the state level arbiter that the WLAN module is active; and code for giving priority to the wireless activity of the Bluetooth module.

41. The computer program product as set forth in claim 37 wherein the code for determining priority for one of the wireless activity of the Bluetooth module and the wireless activity of the WLAN module in the non-transitory computer-readable medium further comprises:

code for receiving in the state level arbiter a Bluetooth ACL from the Bluetooth module;

code for determining in the state level arbiter that the WLAN module is active;

code for giving priority to the wireless activity of the WLAN module; and code for giving priority to the wireless activity of the Bluetooth module only when the Bluetooth activity is designated with a high priority.

42. The computer program product as set forth in claim 37 wherein the code for determining priority for one of the wireless activity of the Bluetooth module and the wireless activity of the WLAN module in the non-transitory computer-readable medium further comprises:

code for receiving in the state level arbiter one of: a Bluetooth inquiry, a Bluetooth paging, a Bluetooth page/inquiry scan and a BT Sniff from the Bluetooth module;

code for determining in the state level arbiter that the WLAN module is in WLAN scan mode; and code for giving priority to the wireless activity of the Bluetooth module.

43. The computer program product as set forth in claim 37 wherein the code for determining priority for one of the wireless activity of the Bluetooth module and the wireless activity of the WLAN module in the non-transitory computer-readable medium further comprises:

code receiving in the state level arbiter one of: a Bluetooth SCO, a Bluetooth ACL and a Bluetooth SCO+ACL from the Bluetooth module;

code for determining in the state level arbiter that the WLAN module is in WLAN scan mode; and code for giving priority to the wireless activity of the WLAN module.

44. The computer program product as set forth in claim 37 wherein the code for determining priority for one of the wireless activity of the Bluetooth module and the wireless activity of the WLAN module in the non-transitory computer-readable medium further comprises:

code for receiving in the state level arbiter one of: a Bluetooth inquiry and a Bluetooth paging from the Bluetooth module;

code for determining in the state level arbiter that the WLAN module is in WLAN connection setup mode; and code for giving priority to the wireless activity of the Bluetooth module.

45. The computer program product as set forth in claim 37 wherein the code for determining priority for one of the wireless activity of the Bluetooth module and the wireless activity of the WLAN module in the non-transitory computer-readable medium further comprises:

code for receiving in the state level arbiter one of: a Bluetooth page/inquiry scan, a Bluetooth Sniff, a Bluetooth SCO, a Bluetooth ACL and a Bluetooth SCO+ACL from the Bluetooth module;

code for determining in the state level arbiter that the WLAN module is in WLAN connection setup mode; and code for giving priority to the wireless activity of the WLAN module.

46. The computer program product as set forth in claim 37 wherein the code for determining priority for one of the wireless activity of the Bluetooth module and the wireless activity of the WLAN module in the non-transitory computer-readable medium further comprises:
    code for receiving in the state level arbiter one of: a Bluetooth inquiry, a Bluetooth paging, a Bluetooth page/inquiry scan and a Bluetooth Sniff from the Bluetooth module;
    code for determining in the state level arbiter that the WLAN module is in WLAN BMPS mode; and
    code for giving priority to the wireless activity of the Bluetooth module.

47. The computer program product as set forth in claim 37 wherein the code for determining priority for one of the wireless activity of the Bluetooth module and the wireless activity of the WLAN module in the non-transitory computer-readable medium further comprises:
    code for receiving in the state level arbiter one of: a Bluetooth SCO and a Bluetooth ACL and a Bluetooth SCO+ACL from the Bluetooth module;
    code for determining in the state level arbiter that the WLAN module is in WLAN BMPS mode; and
    code for giving priority to the wireless activity of the WLAN module.

48. The computer program product as set forth in claim 37 wherein the code for determining priority for one of the wireless activity of the Bluetooth module and the wireless activity of the WLAN module in the non-transitory computer-readable medium further comprises:
    code for receiving in the state level arbiter one of: a Bluetooth inquiry, a Bluetooth paging and a Bluetooth page/inquiry scan from the Bluetooth module;
    code for determining in the state level arbiter that the WLAN module is in WLAN uAPSD mode; and
    code for giving priority to the wireless activity of the WLAN module.

49. The computer program product as set forth in claim 37 wherein the code for determining priority for one of the wireless activity of the Bluetooth module and the wireless activity of the WLAN module in the non-transitory computer-readable medium further comprises:
    code for receiving in the state level arbiter a Bluetooth Sniff from the Bluetooth module;
    code for determining in the state level arbiter that the WLAN module is in WLAN uAPSD mode; and
    code for giving priority to the wireless activity of the Bluetooth module.

* * * * *